United States Patent [19]

Mizuno et al.

[11] Patent Number: 4,656,059

[45] Date of Patent: Apr. 7, 1987

[54] WET SPRAY BOOTH TREATING AGENT AND METHOD FOR TREATMENT THEREWITH

[75] Inventors: Keisuke Mizuno, Yokohama; Eiichirou Kondou, Tokyo; Kenji Tahara, Atsugi; Ayako Sekikawa, Hadano, all of Japan

[73] Assignee: Kurita Water Industries Ltd., Tokyo, Japan

[21] Appl. No.: 793,026

[22] Filed: Oct. 30, 1985
(Under 37 CFR 1.47)

[30] Foreign Application Priority Data

Nov. 1, 1984 [JP] Japan .................................. 59-230647

[51] Int. Cl.$^4$ .......................... B05D 1/40; B05D 3/12
[52] U.S. Cl. ................................... 427/345; 210/729; 210/735; 427/421; 524/598; 528/254
[58] Field of Search ......................... 528/254; 524/598; 427/345, 421; 210/729, 735

[56] References Cited

U.S. PATENT DOCUMENTS

| | | | |
|---|---|---|---|
| 2,884,395 | 4/1959 | Wohnsiedler | 524/598 |
| 4,125,476 | 11/1978 | Dean | 427/345 X |
| 4,130,674 | 12/1978 | Roberts et al. | 427/345 X |
| 4,185,970 | 1/1980 | Dean | 427/345 X |
| 4,481,116 | 11/1984 | Cabestany et al. | 528/254 X |
| 4,600,513 | 7/1986 | Mizutani et al. | 210/712 |

*Primary Examiner*—Lucille M. Phynes
*Attorney, Agent, or Firm*—Frank J. Jordan; C. Bruce Hamburg; Manabu Kanesaka

[57] ABSTRACT

A wet spray booth treating agent, characterized by containing melamine-aldehyde acid colloid solution and a method for the treatment of a wet spray booth, characterized by the use of the aforementioned treating agent.

13 Claims, No Drawings

WET SPRAY BOOTH TREATING AGENT AND METHOD FOR TREATMENT THEREWITH

FIELD OF THE INVENTION AND RELATED ART STATEMENT

This invention relates to a wet spray booth treating agent and to a method for the treatment of a wet spray booth by the use of the agent, and more particularly relates to a wet spray booth treating agent for diminishing the tackiness of coating material entrained in the circulating water to be sprayed for collecting surplus paint and precluding the coating material from adhering fast to the interior of the circulating water system and to a method for the treatment of the circulating water by the use of the treating agent.

Generally in the coating process of the automotive industry, the yield of the paint applied to an automobile body ranges from 60 to 80% and the remainder 40 to 20% of the used paint constitutes an excess paint to be removed in the subsequent process. For the collection of the surplus paint sprayed excessively, the automobile body is treated in a wet spray booth adapted to give a wash with water and the water so used for the washing is circulated for re-use.

In the wet spray booth constructed as described above, since the surplus paint which is collected in the washing water has high tackiness, it adheres to the water-film panel, the piping system, the spray nozzle, etc. of the spray booth, clogs the piping system and the nozzle, and seriously degrades the efficiency of water washing. Further when the surplus paint so deposited clogs the waste gas discharge system and interferes with the flow air in the spray booth, the vapor of the solvent of the paint fills up the interior of the booth to produce a state dangerous to safety and hygiene and seriously degrade the shop environment. Moreover, the greater part of the surplus paint settles to the bottom of the booth pit and the bottom of the circulation pit in the spray booth and the sediment of paint so formed hardens into a rubbery mass with elapse of time and the removal of this hardened mass and the cleaning of the bottoms take up much time and labor.

The paint collected in the washing water not merely undergoes adhesion or sedimentation within the system but also dissolves into components or disperses into fine particles. Particularly, water paint is liable to disperse and increase suspended substances (SS) and total dissolved solids (TDS) in water. An increase in TDS accelerates the progress of corrosion inside the system. Further, the solvent in the paint not merely increases the hydrocarbon (HC) content of the waste gas from the booth but also dissolves into the cleaning water and increases the COD of the water being circulated. The solvent of the paint, depending on the kind thereof, acidifies the circulating water and consequently accelerates the corrosion of the system.

For the solution of these problems, spray booth treating agents for addition to the cleaning water have been developed. Methods which resort to addition to the cleaning water of one member or a mixture of two or more members selected from the group consisting of:
  (1) alkalis such as NaOH and KOH,
  (2) amphoteric metals such as Zn salts,
  (3) cationic polymers, and
  (4) surface active agents have been known to the art.

The conventional treating agents mentioned above, however, do not prove advantages from the commercial point of view because they entail the following disadvantages:
  (a) The effects of the agents are not sufficient.
  (b) The agents are effectively applicable only in narrow ranges of pH, further, it is very difficult to perform stable treatment, and it requires an enormous amount of PH adjusting agents.
  (c) Owing to liberation of treating agents, the COD contents in the circulating water are increased.
  (d) As the result, the difficulty encountered in the disposal of waste water is aggravated and the amount of the sludge content in the waste water is increased.

OBJECT AND SUMMARY OF THE INVENTION

An ojbect of this invention is to provide a wet spray booth treating agent freed from the aforementioned drawbacks of the conventional methods and possessed of an outstanding effect and a method for the treatment by the use of the agent.

Another object of this invention is to provide a wet spray booth treating agent applicable effectively in a wide range of pH and capable of providing stable treatment and a method for the treatment by the use of the agent.

Yet another object of this invention is to provide a wet spray treating agent such that the waste water resulting from the treatment therewith is easily disposable and a method for the treatment by the use of the agent.

These objects are attained by a wet spray booth treating agent characrerized by containing melamine-aldehyde acid colloid solution and a method for the treatment of surplus paint in a wet spray booth, characterized by addition of melamine-aldehyde acid colloids solution.

DETAILED DESCRIPTION OF PREFERRED EMBODIMENTS

Now, the present invention will be described in detail below.

The melamine-aldehyde acid colloid solution to be used in the present invention can be produced, as indicated from the examples of production cited afterward, by causing melamine to react with aldehyde thereby forming methylol melamine and adding an acid to the methylol melamine. It may otherwise be produced by further alkyl-etherifying the methylol melamine and adding an acid to the etherification product.

Examples of the aldehyde usable advantageously in this invention are formaldehyde, paraformaldehyde, acetaldehyde, and propionaldehyde. In these aldehydes, formaldehyde and paraformaldehyde prove particularly desirable from the standpoint of ease of handling and efficiency of reaction.

The proportions of melamine and aldehyde to be used in the production of the aforementioned acid colloid solution are dessired to be such that the amount of aldehyde falls in the range of 1 to 6 mols per mol of melamine.

When the amount of aldehyde exceeds 2.5 mols, however, the amount of free aldehyde in the produced acid colloid solution is large. Since the free aldehyde forms a source for COD, the amount of aldehyde is desired to be not more than 2.5 mols where COD causes a problem.

The methylol melamine obtained as described above does not dissolve in water but dissolves in a colloidal state in an acid solution. The alkyletherified methylol melamine which is obtained by further alkyletherifying the aforementioned methylol melamine is soluble in water and is converted into a colloid by addition of an acid.

The acid to be used advantageously in the production of the acid colloid solution is a monobasic acid. Examples of the monobasic acid are mineral acids such as hydrochloric acid and nitric acid and organic acids such as formic acid, acetic acid, lactic acid, and propionic acid. In these acids, hydrochloric acid proves particularly desirable because it is capable of stably forming a colloid solution.

The amount of the monobasic acid, particularly hydrochloric acid, to be added advantageously falls in the range of 0.5 to 1.5 mols, preferably 0.7 to 1.3 mols, based on 1 mol of melamine.

If the amount of the acid added is less than 0.5 mol, the produced solution is not easily enabled to manifest the acid colloidality. Conversely if the amount exceeds 1.5 mols, the produced colloid solution is liable to suffer from insufficient stability.

During the initial stage of preparation of the methylol melamine acid colloid solution, the acid colloid solution contains a large amount of free aldehyde. When this acid colloid solution is left standing and aging at room temperature after completion of its preparation, the amount of free aldehyde decreases. This aging can be accelerated by heating the acid colloid solution. The proper time of this aging is in the range of 5 days to three months where the aging is made at room temperature and in the range of about two to three hours where the aging is made by heating at 50° C., for example.

The wet spray booth treating agent of the present invention is desired to contain the melamine-aldehyde acid colloid obtained as described above in a proportion of 0.1 to 20% by weight, preferably 0.1 to 15% by weight. Optionally, the treating agent of this invention may additionally incorporate therein an alkali agent, a surface active agent, a watersoluble high molecular weight flocculant, and an inorganic flocculant such as PAC (Polyaluminum chloride), aluminum sulfate, or ferric chloride.

The alkali alakali agent is effective in diminishing the tackiness of the paint and corrosionproofing the apparatus.

The surface active agent is effective in improving the paint in dispersibility and emulsifiability. As the surface active agent, one member or a combination of two or more members selected freely from the group consisting of anionic surface active agents, nonionic surface active agents, amphoteric ionic surface active agents, and cationic surface active agents can be used. Concrete exampels of the surface active agent are anionic surface active agents such as sodium alkylbenzene sulfonates, higher alcohol sodium sulfuric esters, sodium alkylsulfuric esters, sodium alkylsulfates, sodium alkylsulfosuccinates, sodium dialkylsulfosuccinates, sodium alkylnaphtanlenesulfonates-formalin condensates, sodium alkylnaphtanlenesulfonates, sulfonated heterocyclic compounds, and fatty acid-amino acid condensates; nonionic surface active agents such as polyoxyethylene alkyl ethers, polyoxyethylene alkylaryl ethers, polyethylene glycol fatty acid esters, polyoxyethylene fatty acid amide ethers, polyethylene glycol alkylamine ethers, polyhydric alcohol fatty acid esters, polyoxyethylene polyhydric alcohol fatty acid esters, and alkylolamides; amphoteric surface active agents such as betaine type, imidazoline type, sulfonate type, and alanine type; and cationic surface active agents such as alkylpyridinium hydrochlorides, alkyltrimethylammonium halides, polyoxyethylene alkylamines, and polyoxyethylene dodecylamines. For the purpose of this invention, it is desirable to use a nonionic surface active agent among other surface active agents cited above.

The amount of the surface active agent to be properly used is in the range of 0.01 to 1 part by weight, based on 1 part by weight of the melamine-aldehyde acid colloid solution.

The water-soluble high molecular weight flocculant or the inorganic flocculant such as PAC, aluminum sulfate, or ferric chloride is effective in heightening the solid-liquid separating property.

As the water-soluble high molecular weight flocculant, any of the known substances can be used. Among other substances, acrylamide type substances prove particularly desirable. Concrete examples of the water-soluble high molecular weight flocculant advantageously used herein include polyacrylamide, polymethacrylamide, partial hydrolyzates of polyacrylamide and polymethacrylamide, copolymers of acrylamide or methacrylamide with other vinyl type monomers such as acrylic esters, acrylonitrile, dialkylaminoethyl methacrylate, and quaternization products thereof, polyalkylene polyamines represented by polyethylene imine, water-soluble dicyandiamide-formaldehyde condensate, polydimethyldiallyl ammonium salt, epihalohydrin-amine condensates, and cationized guayule rubber.

The amount of the water-soluble high molecular weight flocculant or the inorganic flocculant to be suitably added is in the range of 0.01 to 1 part by weight based on 1 part by weight of the melamine-aldehyde acid colloid.

Now, the method of treatment by the use of the wet spray booth treating agent of this invention described above will be explained below.

The method of treatment contemplated by this invention resides in injecting the aforementioned treating agent of this invention into the cleaning water being circulated through a wet spray booth thereby obliterating tackiness of the surplus paint collected in the cleaning water, preventing the surplus paint from adhering fast to the water-film panel and the piping, and precluding the sludge sedimenting inside the pit from agglutination.

For the purpose of the present invention, the amount of the treating agent of this invention to be properly added to the cleaning water is such that the weight of the melamine-aldehyde acid colloid solution relative to the weight of the surplus paint falls in the range of 0.1 to 300%, preponderantly in the range of 1 to 10%. The amount of the treating agent relative to the amount of the circulating water is variable with the amount of paint used for coating and the method of application of the paint. It is safe by any standard to fix the concentration of the melamine-aldehyde acid colloid solution in the circulating water roughly in the range of 1 to 5,000 ppm as by a jar test.

After the treating agent of this invention is added to the circulating water, the pH of the circulating water is desired to be adjusted in the range of 4 to 10, preferably 5 to 9. If the pH is less than 4 or more than 10, the treating agent cannot sufficiently manifest its effect in diminishing the tackiness of the surplus paint. (This impairment of the effect may be logically explained by a postulate that when the pH of the treating agent is excessively low or excessively high, the association of colloid does not readily proceed sufficiently.)

The acid and the alkali to be used for the adjustment of the pH can be selected from among various known acids and alkalis such as hydrochloric acid, nitric acid, sodium hydroxide, and ammonia.

The addition of the treating agent of this invention is generally effected by continuous injection proportionately to the amount of the washing water to be sprayed. Optionally, it may be effected by intermittent injection.

The position at which the treating agent is added to the cleaning water system is not specifically limited, but the addition is made most effectively on the circulation water feed side, particularly at the point of the system immediately preceding the point of contact between the cleaning water and the surplus paint.

When the surplus paint is collected in the circulating water sprayed inside the wet spray booth, the tackiness of the surplus paint in the circulating water is diminished substantially to null and the paint is converted into free-flowing discrete particles and, consequently, prevented from adhering fast to the interior of the system by the wet spray booth cleaning agent of the present invention.

The mechanism responsible for the diminution of tackiness of the surplus paint in the circulating water has not been fully elucidated. The effect thus brought about may be logically explained by a postulate that melamine-aldehyde which is dissolved in a colloidal state in the acid solution, when added into the circulating water and exposed to a higher pH level, is deprived of its colloidality and consequently enabled to undergo association and, during this association, allowed to engulf and insolubilize the paint components. Since the masses of melamine aldehyde which have engulfed the paint components strongly manifest the quality as melamine-aldehyde resin, they are believed to deprive the paint of its tackiness.

The method of treatment of this invention which resides in injecting the wet spray booth treating agent of the present invention operating as described above brings about various effects as follows:

(1) The surplus paint is prevented from adhering to the piping and clogging the nozzle and the efficiency of washing of the wet spray booth system is consequently maintained advahtageously.

(2) The otherwise possible deterioration of the shop environment as by the clogging in the waste gas discharge system can be precluded.

(3) The paint sludge which sediments or floats in the booth pit is not easily solidified and can be readily removed.

(4) The waste of washing can be easily separated into solid and liquid and the wastewater can be easily treated.

(5) Since the COD concentration in the circulating water is lowered, the amount of the waste of washing to be disposed of can be decreased to a great extent.

(6) The wet spray booth system can be prevented from otherwise possible corrosion.

(7) The treatment can be effectively performed in a wide pH range.

Thus, the treatment of the spray booth can be carried out very advantageously on a commercial scale.

Now, the present invention will be described more specifically below with reference to example of production, working examples, and comparative experiments.

This invention is not limited to the working examples so cited but may be practised otherwise without departing from the spirit of the invention disclosed herein.

EXAMPLE OF PRODUCTION OF MELAMINE-ALDEHYDE ACID COLLOID SOLUTION

In 93 ml or distilled water, 63 g (0.5 mol) of melamine and 30 g (1.0 mol as formaldehyde) of paraformaldehyde were combined. The resultant mixture was adjusted to pH 10.0 by addition of NaOH and then heated to 70° C. to dissolve melamine therein. The mixture was further held at 70° C. for reaction for five minutes. It was then left standing at room temperature for gradual cooling and consequent precipitaion of methylol melamine crystals. The precipitate was filtrated with a Büchner funnel, washed with methanol, and dried under a vacuum. The dry methylol melamine, by elementary analysis, was found to consist of melamine and formaldehyde at mol ratio of 1:2.19.

An acid colloid solution was obtained by stirring 10 g (0.05 mol) of the mehtylol melamine in 100 ml of an aqueous 1.35% hydrochloric acid solution (0.75 mol based on melamine). Before use in any of the following working examples, this acid colloid solution was left standing at room temperature for 12 days for aging.

EXAMPLE 1-8

A paint solution was prepared by dissolving an acrylic type resin paint in a solvent (composed of toluene, acetone, methyl acetate, and methanol in a volume ratio of 10:30:30:30). This paint solution was added dropwise into service water under rapid stirring (at 5,000 rpm with a magnetic stirrer) to prepare a paint dispersion to be used as model wet paint booth circulation water. By analysis, this circulating water was found to possess the following quality.

Concentration of paint: 2,000 mg/liter
pH: 6.7
Electroconductivity: 590 μS/cm
SS: 1,500 mg/liter
COD: 400 mg/liter In a beaker, 500 ml of the model circulating water was placed, when necessary, adjusted to the pH value indicated in Table 1 with HCl or NaOH, and stirred for two minutes with a varying amount shown in Table 1 of the melamin-aldehyde acid colloid solution prepared in the aforementioned example of production. Then, the stirred mixture was left standing for 30 minutes. The water and the suspended matter was discarded from the beaker and the paint adhering to the inner wall of the beaker was dried and weighed. The results are shown in Table 1.

EXAMPLE 9

The procedure of Example 1 was repeated to determine the weight of adhering paint, except that melamine-aldehyde acid colloid and a polyethylene glycol type nonionic surface active agent in the amounts indicated in Table 1 were combined and the resultant mixture was adjusted to pH 6.5.

The results are shown in Table 1.

COMPARATIVE EXPERIMENTS 1-5

The procedure of Example 1 was repeated to determine the weight of adhering paint, except that zinc chloride (Comparative Experiments 1-3), polyethylene glycol type surface active agent (Comparative Experiment 1), and PAC (Comparative Experiment 5) were used in the place of melamine-aldehyde acid colloid.

The results are shown in Table 1.

COMPARATIVE EXPERIMENT 6

The procedure of Example 1 was repeated to determine the weight of adhering paint, except that use of the paint booth treating agent was completely omitted.

The results are shown in Table 1.

It is noted from Table 1 that the wet paint booth treating agent of the present invention, at a small application rate, is capable of decreasing the amount of adhering paint and notably diminishing the adhesion of the paint to the interior of the wet spray booth. It is further noted that the treating agent manifests its effect in the neutral region of pH and in the ordinary regions of acidity and alkalinity.

TABLE 1

| Example | Paint booth treating agent | Amount added (% based on paint) | pH of treatment | Amount of adhering paint (g) |
|---|---|---|---|---|
| Example | | | | |
| 1 | Melamine-aldehyde acid colloid | 5 | 8.7 | 0 |
| 2 | Melamine-aldehyde acid colloid | 2.5 | 8.7 | 0 |
| 3 | Melamine-aldehyde acid colloid | 1.5 | 8.7 | 0.20 |
| 4 | Melamine-aldehyde acid colloid | 1 | 8.7 | 0.25 |
| 5 | Melamine-aldehyde acid colloid | 0.1 | 8.7 | 0.30 |
| 6 | Melamine-aldehyde acid colloid | 1 | 5.0 | 0.28 |
| 7 | Melamine-aldehyde acid colloid | 1 | 8.0 | 0.15 |
| 8 | Melamine-aldehyde acid colloid | 1 | 9.0 | 0.10 |
| 9 | Melamine-aldehyde acid colloid | 1 | 8.5 | 0.08 |
|   | Polyethylene glycol type surface acid active agent | 0.1 | | |
| Comparative Experiment | | | | |
| 1 | Zinc chloride | 5 | 6.0 | 0.8 |
| 2 | " | 5 | 7.0 | 0.6 |
| 3 | " | 5 | 8.0 | 0.5 |
| 4 | Polyethylene glycol type surface active agent | 1 | 6.5 | 0.7 |
| 5 | P A C | 5 | 6.7 | 0.8 |
| 6 | Blank | 0 | 8.7 | 0.9 |

What is claimed is:

1. A method for the treatment of the circulating water collecting surplus paint in a wet spray booth, which method is characterized by the addition of melamine-aldehyde acid colloid solution.

2. A method according to claim 1, wherein said melamine-aldehyde acid colloid solution is added to the circulating water in said wet spray booth.

3. A method according to claim 1, wherein said melamine-aldehyde acid colloid solution is added in an amount in the range of 0.1 to 300 parts by weight based on the amount of sur paint to be treated.

4. A method according to claim 3, wherein said melamine-aldehyde acid colloid solution is added in an amount in the range of 1 to 10 parts by weight based on the amount of surplus paint to be treated.

5. A method according to claim 2, wherein said melamine-aldehyde acid colloid solution is added in a concentration in the range of 1 to 5000 ppm in the circulating water.

6. A method according to claim 1, wherein said melamine-aldehyde acid colloid solution is obtained by adding 1.0 to 2.5 mols of aldehyde into 1 mol of melamine for reaction therebetween, and adding thereinto 0.5 to 5 mols of an acid relative to 1 mol of melamine.

7. A method according to claim 6, wherein said melamine-aldehyde acid colloid solution is added into the circulating water in an amount of 0.1 to 300 parts by weight relative to one part by weight of surplus paint to be treated, a concentration of the melamine-aldehyde acid colloid solution in the circulating water being in the range of 1 to 5000 ppm.

8. A method according to claim 7, further comprising adding into the circulating water an alkali agent for diminishing tackiness of a paint and corrosion-proofing of a circulating system, a surface active agent for improving paint dispersibility and emulsifiability, and a flocculant for improving solid-liquid separating property.

9. A water circulating system for treating surplus paint in a wet spray booth comprising, a circulating water and melamine-aldehyde acid colloid solution prepared by adding 1.0 to 2.5 mols of aldehyde into 1 mol of melamine for reaction therebetween and adding thereinto 0.5 to 5 mols of an acid relative to 1 mol of melamine, said colloid solution being added into the circulating water in an amount of 0.1 to 300 parts by weight relative to one part by weight of surplus paint to be treated, said water circulating system having a pH in the range of 4 to 10.

10. A water circulating system according to claim 9, wherein said circulating water including the melamine-aldehyde acid colloid solution has a pH in the range of 5 to 9.

11. A water circulating system according to claim 10, further comprising an alkali agent for diminishing tackiness of a paint and corrosion-proofing of a circulating system, a surface active agent of improving paint dispersibility and emuslifiability, and a flocculant for improving solid-liquid separating property.

12. A wet spray booth treating agent comprising melamine-aldehyde acid colloid solution, an alkali agent for diminishing tackiness of a paint and corrosion-proofing of a circulating system, a surface active agent for improving paint dispersibility and emulsifiability, and a flocculant for improving solid-liquid separating property.

13. A wet spray treating agent according to claim 12, wherein said melamine-aldehyde acid colloid solution is prepared by adding 1.0 to 2.5 mols of aldehyde into 1 mol of melamine for reaction therebetween and adding thereinto 0.5 to 5 mols of an acid relative to 1 mol of melamine, said colloid solution being added into the circulating water in an amount of 0.1 to 300 parts by weight relative to one part by weight of surplus paint to be treated, said circulating water having a pH in the range of 4 to 10.

* * * * *

UNITED STATES PATENT AND TRADEMARK OFFICE
CERTIFICATE OF CORRECTION

PATENT NO. : 4,656,059
DATED : April 7, 1987
INVENTOR(S) : Keisuke Mizuno et al

It is certified that error appears in the above-identified patent and that said Letters Patent are hereby corrected as shown below:

On front page, section [22] (filing date of application), delete "(under 37 CFR 1.47)".

Signed and Sealed this

Twenty-fifth Day of April, 1989

Attest:

DONALD J. QUIGG

*Attesting Officer*  *Commissioner of Patents and Trademarks*